UNITED STATES PATENT OFFICE.

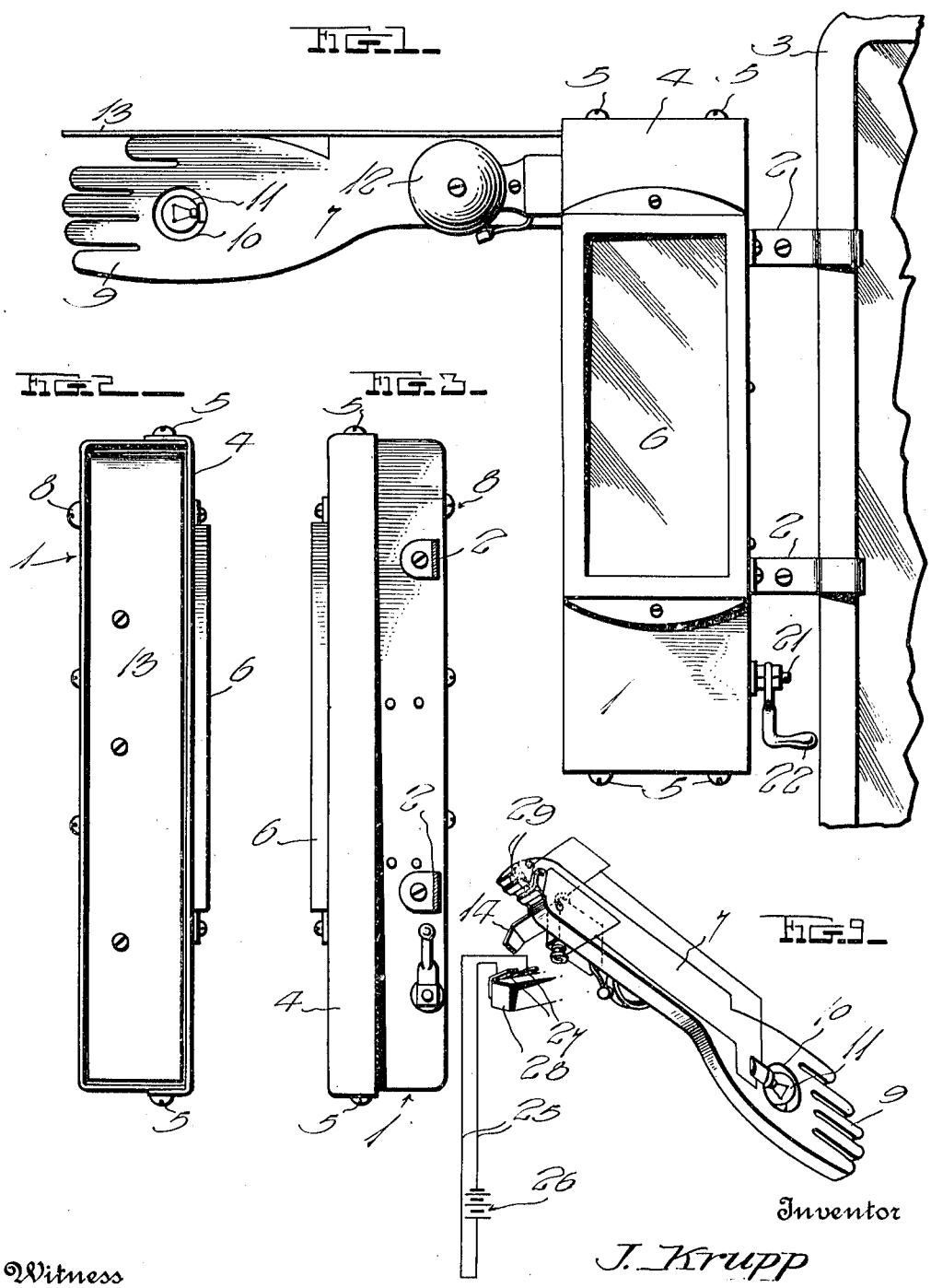

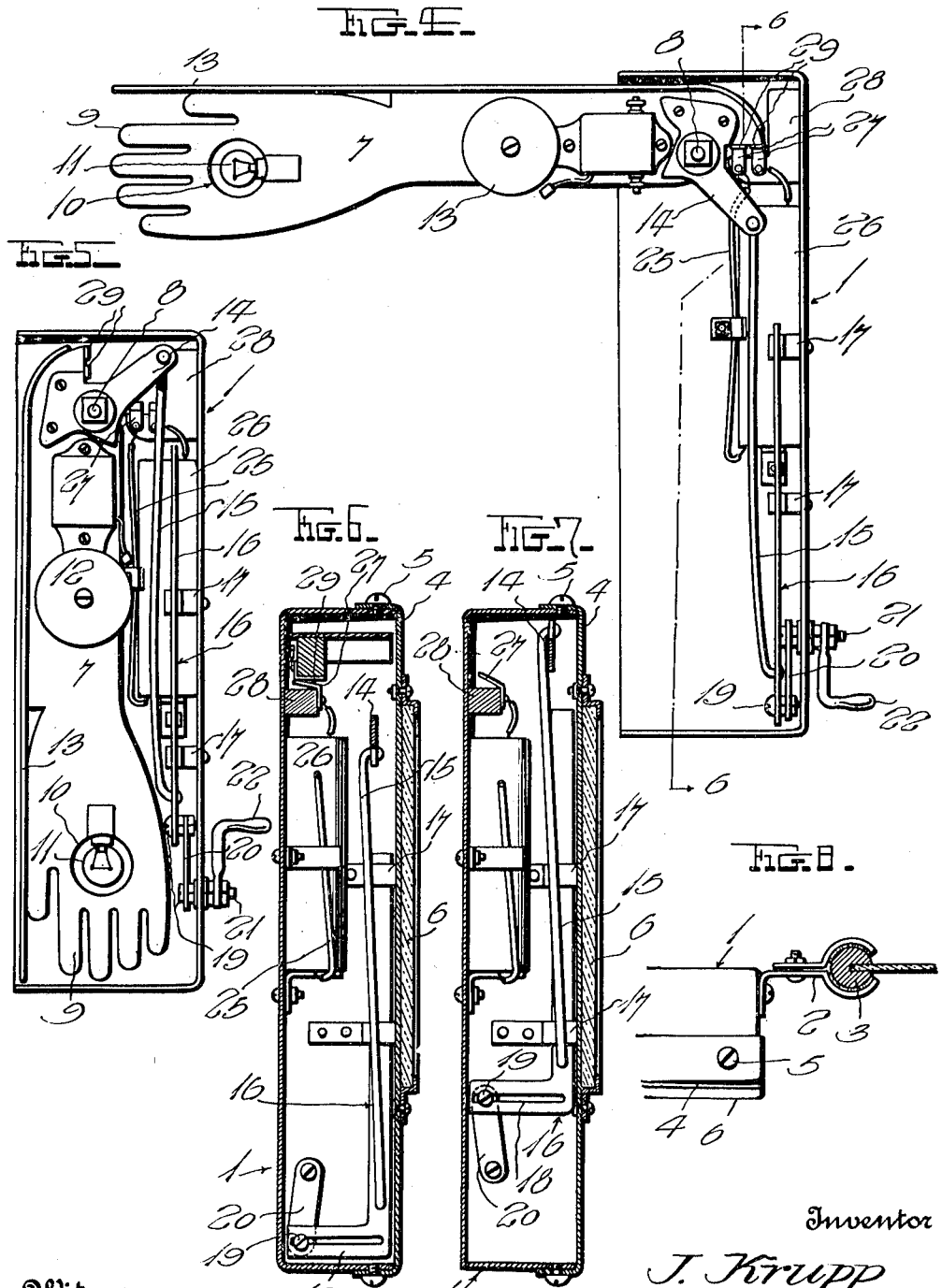

JAMES KRUPP, OF MILWAUKEE, WISCONSIN.

TURNING AND STOPPING SIGNAL FOR MOTOR-VEHICLES.

1,270,174. Specification of Letters Patent. Patented June 18, 1918.

Application filed February 6, 1918. Serial No. 215,643.

*To all whom it may concern:*

Be it known that I, JAMES KRUPP, a citizen of the United States, residing at Milwaukee, in the county of Milwaukee and State of Wisconsin, have invented certain new and useful Improvements in Turning and Stopping Signals for Motor-Vehicles; and I do declare the following to be a full, clear, and exact description of the invention, such as will enable others skilled in the art to which it appertains to make and use the same.

My invention has for its principal object the provision of a simple and inexpensive, yet highly efficient device for use upon motor vehicles to signal the drivers of other vehicles, to pedestrians and to traffic policemen, when the machine will turn in one direction or the other or when it is to be brought to a stand still; and in this connection a further object is to provide a device which will be both audible and visible by night as well as day.

With the foregoing in view, the invention resides in the novel features of construction and unique combinations of parts to be hereinafter fully described and claimed, the descriptive matter being supplemented by the accompanying drawings which form a part of this specification and in which:

Figure 1 is a side elevation of the improved signal applied to an automobile wind shield;

Fig. 2 is an outer edge view;

Fig. 3 is an inner edge view;

Fig. 4 is a view similar to Fig. 1 with the removable rear side of the casing detached;

Fig. 5 is a duplicate of Fig. 4 with the exception that it illustrates the signal arm in retracted position;

Fig. 6 is a vertical section on the plane of the line 6—6 of Fig. 4;

Fig. 7 is a duplicate of Fig. 6 with the exception that it illustrates the relative arrangements of parts when the signal arm is retracted;

Fig. 8 is a detail horizontal section, showing one of the clamps for securing the device to the wind-shield; and Fig. 9 is a perspective view illustrating more particularly the contacts for completing the circuit of the electric bell and light which are mounted on the signal arm.

In the drawings above briefly described, the numeral 1 designates a flat vertically elongated metal casing whose inner edge is provided with suitable clamps 2 for securing it to the windshield 3 of an automobile or to any other preferred part of the vehicle. The rear side 4 of the casing 1 is removably secured in place by screws or the like 6 and is by preference equipped with a traffic mirror 5 for the well known purposes. The outer side or edge of the casing 1 is open so that the signal arm 7 which is formally housed in said casing, may be projected therefrom as shown for instance in Figs. 1 and 4.

The arm 7 is pivoted at its upper end in the casing 1 as shown at 8 and this arm is preferably fashioned after the human arm as shown, being provided at its outer end with a hand 9 having an opening 10 in which an electric light 11 is located. An electric bell 12 is carried by the arm 7 or if desired may be mounted fixedly within the casing 1, and by the means yet to be described, projection of the arm from the casing will simultaneously illuminate the light 11 and sound the alarm 12. The outer or upper edge of the arm 7 is by preference provided with a plate 13 extending throughout the length thereof and serving to close the open outer side of the casing 1 when the arm is retracted. This plate also serves more or less to protect the arm from rain, snow and the like when projected.

The pivoted upper end of the arm 7 is provided with a suitable crank arm 14 to which the upper end of a vertical link or rod 15 is pivoted, the lower end of this part being pivoted to an L-shaped slide 16 whose vertical arm is slidably received in suitable guides 17 mounted within the casing and by preference secured to the inner side thereof. These guides may well be forked as shown in the drawings and removal of the slide will then be prevented by the casing side 4. The horizontal arm of the slide 16 is provided with a longitudinal slot 18 receiving a wrist pin 19 on a crank arm 20, this arm being carried rigidly on the inner end of a short rock shaft 21 which extends through the inner side of the casing 1 and is provided on its outer end with a crank or the like 22. By preference, the crank 22 is in a raised position when the arm 7 is retracted, and the arm 20 is th.. positioned slightly beyond dead center so that the several parts will be held against accidental movement. A downward pull on the crank 22 however will shift the slide 16 downwardly from the position shown in Figs. 5 and 7 to that illustrated in Figs. 4 and 6, with the result that the link 15 so pulls upon the crank arm 14 as to project the signal arm 7. When the crank 22 is thus swung downwardly, the arm 20 again moves beyond dead center as shown most clearly in Fig. 6, so that the signal arm 7 will be held in extended position until lowered by again suitably operating the crank 22.

Wiring 25 leads from a battery 26 either in the casing 1 or at any other suitable point, said wiring being connected to a pair of contacts 27 mounted on a suitable ledge 28 in the casing 1 for engagement by other contacts 29 on the pivoted end of the signal arm 7 when the latter is extended as will be clear from Figs. 4, 5 and 9. By any preferred wiring which may well be located in the arm 7, the light 11 and bell 12 are connected to the contacts 29 and it will thus be seen that when the arm is extended, the light will be illuminated and the bell sounded, so that both visible and audible warning are given that the vehicle will either turn or stop.

The device may be secured to the wind shield of the machine or to any other preferred part thereof and is of particular advantage upon closed cars or upon the open models of machines when the storm curtains are in use, it being of course understood that the rock shaft 21 may be of a suitable length to extend from the exterior of the machine to the interior thereof to be easily accessible to the operator. Whenever necessary, the crank 22 is pulled downwardly with the result that the signal arm 7 is immediately extended. At the same time the audible and visible signals are operated so that the device will be equally as effective at night as in daylight.

The device is simple and inexpensive, yet from the foregoing it will be obvious that the same will be highly efficient and durable. For these reasons, the several details shown and described constitute the preferred form of the invention, but it is to be understood that within the scope of the appended claims, numerous minor changes may well be made.

I claim:

1. A turning and stopping signal for vehicles comprising a vertically disposed casing having an open side, a signal arm in said casing and pivoted at its upper end for outward swinging through said open side, a vertically movable slide in said casing having a horizontal slot, means connecting said slide and said arm for projecting the latter upon vertical movement of the former in one direction, and an operating crank having a wrist pin received slidably in said slot for so shifting said slide.

2. A turning and stopping signal for vehicles comprising a vertically disposed casing having an open side, a signal arm in said casing and pivoted at its upper end for outward swinging through said open side, a vertically movable L-shaped slide in said casing, guiding means for the vertical arm of said slide, the horizontal arm thereof having a longitudinal slot, means connecting said slide and said arm for projecting the latter upon vertical movement of the former in one direction, and an operating crank having a wrist pin received slidably in said slot.

3. A turning and stopping signal comprising a casing having an open side and a removable side, a signal arm pivoted in said casing for outward swinging through said open side thereof, an L-shaped slide in said casing located in a plane at right angles to said removable side, open-ended guides for the vertical arm of said slide, the ends of said guides being normally closed by said removable side of the casing, connecting means between said slide and said arm for projecting the latter upon actuation of the former, and an operating crank for said slide having a wrist pin, the horizontal arm of said slide having a longitudinal slot in which said wrist pin is slidably received.

In testimony whereof I have hereunto set my hand in the presence of two subscribing witnesses.

JAMES KRUPP.

Witnesses:
 O. L. O'BOYLE,
 P. N. SAMPON.